United States Patent [19]

Murphy

[11] Patent Number: 4,642,041
[45] Date of Patent: Feb. 10, 1987

[54] EXTRUDER SCREW FOR MINIMIZING THE OPPOSING PRESSURE FLOW

[76] Inventor: Richard W. Murphy, 330 Tamarack Dr., Allentown, Pa. 18104

[21] Appl. No.: 824,678

[22] Filed: Jan. 31, 1986

[51] Int. Cl.⁴ .............................................. B29B 7/14
[52] U.S. Cl. .................................... 425/208; 264/349; 366/88; 425/209
[58] Field of Search .......................... 366/88, 89, 323; 264/176 R, 349; 425/204, 207, 208, 209, 376 R, 168

[56] References Cited

U.S. PATENT DOCUMENTS

| | | | |
|---|---|---|---|
| 3,070,836 | 1/1963 | DeHaven et al. | 425/208 |
| 4,118,164 | 10/1978 | Wenger et al. | 425/208 |
| 4,129,386 | 12/1978 | Rauwendaal | 425/208 |
| 4,171,196 | 10/1979 | Maillefer | 425/208 |
| 4,310,484 | 1/1982 | Blakeslee, III | 425/208 |
| 4,321,229 | 3/1982 | Blakeslee, III et al. | 264/349 |
| 4,357,291 | 11/1982 | Miller et al. | 425/208 |

FOREIGN PATENT DOCUMENTS 2405693 6/1975 Fed. Rep. of Germany ...... 425/204

Primary Examiner—Jay H. Woo
Assistant Examiner—J. Fortenberry
Attorney, Agent, or Firm—William B. Noll

[57] ABSTRACT

This invention, in its preferred embodiment, relates to an improved extruder screw, for plastics and like materials, wherein said screw includes, in sequence, a (1) feed section, (2) transition section, and (3) metering section, and a plurality of back flow seals to minimize the pressure flow opposing the moving materials passing therealong. Preferably, said seals comprise a first length of flighting having a reduced pitch over that preceding said first length of flighting, and a second length of flighting having zero pitch.

7 Claims, 5 Drawing Figures

EXTRUDER SCREW FOR MINIMIZING THE OPPOSING PRESSURE FLOW

BACKGROUND OF THE INVENTION

This invention relates to an improved extruder screw design for use in the plastics industry where solid feed materials are transformed into a melted product by the application of heat and compression. This transformation takes place while the feed mix is being conveyed through the extruding machine.

As is known in the molding art, an extruder is a machine that has a helical screw that rotates within a fixed housing, jacketed for heating/cooling. The solid mixture being processed is fed into the machine at one end through a hopper arrangement, and the melted product is discharged or extruded out the other end.

The typical extruder screw, as described and illustrated in the following U.S. Pat. Nos. 4,310,484 (Blakeslee, III) and 4,129,386 (Rauwendaal), consists of at least three (3) defined sections. The section where the solid feed mix is introduced into the housing through a hoppered entry opening is termed the feed section. Next is a transition section, sometimes referred to as compression section, where some compression of the mix, along with melting thereof, takes place. The third or typically the final section in sequence is termed the metering section. In this area of the extruder, the partially melted mix and the remaining solid feed are conveyed toward the discharge opening. The final melting of the mix takes place in this last section. While the conventional extruder screw contains such three (3) sections, some more complex designs may call for a second feed section, for example, and corresponding transition and metering sections.

There are two important opposing flows within an extruder in operation. The forward flow due to the action of the helical screw forcing the material forward and through the heated/cooled housing is termed the drag flow component. Acting in opposition to the drag flow component is the pressure flow component. It is the result of the force developed from the total resistances encountered as the helical screw forces the molding material through the extruder housing. According to Miller et. al., U.S. Pat. No. 4,357,291, the speed of the screw does not directly affect the pressure flow component. However, it may affect such factors as back pressure and material viscosity, which factors, in turn, affect significantly the pressure flow component. On the otherhand, pressure flow is directly affected by both the depth and length of the screw channel. Thus, an increase in channel depth has a tendency to increase greatly the pressure flow component, while an increase in channel length has a tendency to reduce this back flow component.

Another complicating factor in the design of extruder screws is the molding material itself. Many formulations encountered in the extrusion of plastic molding compounds have components with a wide range of physical characteristics including particle size and density. This fact makes it difficult to maintain a homogeneous mix through the extrusion process, resulting in variations in product density. Due to inefficient conveying characteristics, i.e. drag flow, of existing designs, vascillations of flow will occur when pressure flow momentarily will exceed the drag flow, causing a back flow of material. This phenomenon of back flow is evidenced by accentuated wear on the screw and undercutting of the flighting, where this takes place. This wear is concentrated near the base of the flighting at its juncture with the root diameter. The wear is especially pronounced on screws processing formulations containing high proportions of abrasive materials.

From the above, as well as other prior art, there clearly has been a recognition of the forces acting within an extruder apparatus. Further, means have been proposed to try to control or contain such forces in order to optimize efficiency of operation and quality of product. For example, in Blakeslee, III, U.S. Pat. No. 4,310,484 an extruder screw having a decreasing pitch, the distance from a point on one flight to a corresponding point on an adjacent flight, from the feed section to the metering section has been proposed as a way of reducing the problem of back flow. Additionally, the patentee proposed the use of such decreased pitch over an extended length of flighting.

The extent of the available prior art would suggest that no single authority exists on the resolution or control of the forces within the extruder. With the present invention, an extruder screw has been designed which will allow the judicious increase in drag flow forces, and corresponding decrease in the pressure flow forces, while producing with duplicity a homogeneous, quality product at increased capacities over existing screw designs. The features thereof will become apparent from the specification which follows.

SUMMARY OF THE INVENTION

This invention, in its preferred embodiment, relates to an improved extruder screw, for plastics and like materials. The extruder screw includes, in sequence, a (1) feed section, (2) transition section, and (3) metering section. The distinguishing feature of such extruder screw is the provision of a plurality of back flow seals to minimize the pressure flow opposing the moving materials passing therealong. Preferably, the first of said seals comprise a first length of flighting in the feed section having a reduced pitch over that preceding said first length of flighting, and a second length of flighting thereafter having zero pitch. Following, the flighting of the original pitch, i.e. pitch prior to back flow seal, may be resumed or some other increased pitch of choice. A second seal, comparable to said first seal, is situated near the end of said transition section.

DETAILED DESCRIPTION OF PREFERRED EMBODIMENT

Figure 1:
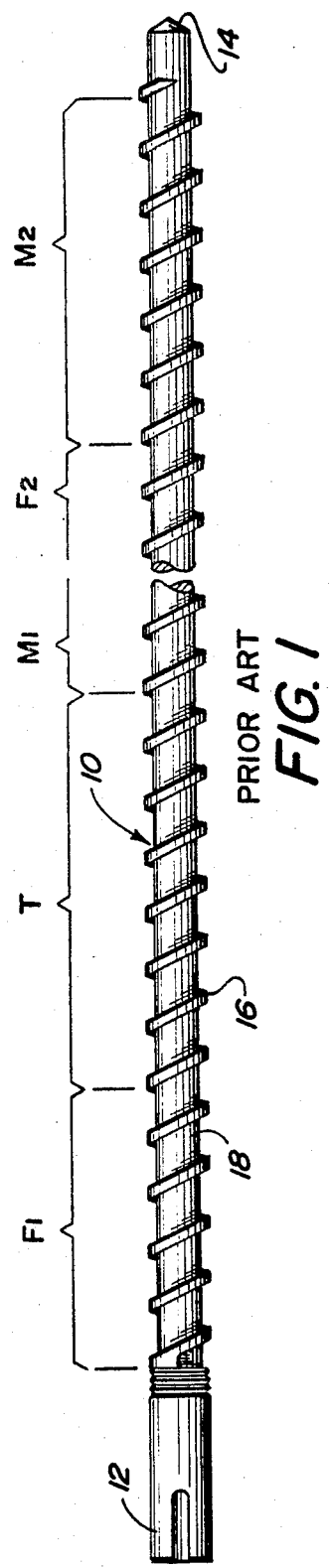
FIG. 1 is a side elevation of an extruder screw, showing the various sections thereof in sequence, according to the prior art.

In order to understand the contributions of this invention over prior art developments in the extrusion of materials, such as polymeric materials and the like, it will be helpful to review the design of an extruder screw according to the prior art, see FIG. 1.

Referring to FIG. 1, reference numeral 10 indicates a complete extruder screw for injection molding, for example. Extruder screws are adapted to rotate within a housing (barrel) where end 12 is dimensioned to fit into a chuck motorized for rotation. The opposite end 14 rides free within the housing such that the extruded material is free to exit the housing.

Extruder screw 10 is composed of a plurality of sections, which by way of example are identified as feed section $F_1$, transition section T, metering section $M_1$, feed section $F_2$, and metering section $M_2$. The respective sections are shown having a helical flight 16 which is set at a constant helix angle. However, within a section such angle may vary. Finally, for the two feed sections $F_1$, $F_2$, the extruder screw root diameter is reduced to suitably accept the feed material.

In operation, the feed material is fed into section $F_1$ and forcibly conveyed along channel 18 toward transition section T. The feed material is subjected to compression in transition section T which manifests itself in a buildup of heat due to a reduction in the channel cross-section. That is, with a given or constant housing (barrel) diameter, as the root diameter increases the channel depth or cross-section decreases. Additionally, externally applied heat is used to facilitate melting and mixing in the metering section $M_1$. Subsequently, a second feed material may be added in feed section $F_2$ followed by further transition/metering and eventual discharge of the fully mixed material. Notwithstanding this rather straight forward explanation of an extruder's operation, countless problems, described previously, may be encountered affecting the efficiency of the operation.

Figure 3:
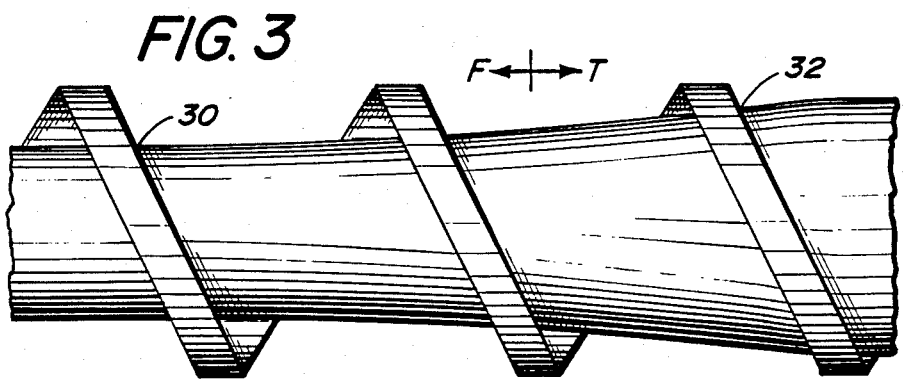
FIG. 3 is a partial enlarged side elevation of typical feed and transition sections of an extruder screw showing critical points along such screw.

FIG. 3 is presented to illustrate and detail certain of the inherent problems which are in part associated with the design of the extruder screw. FIG. 3 is a partial enlarged side elevation showing the details of a partial typical feed section and transition section. FIG. 3 shows the terminal portion of a feed section just prior to the transition section. The feed section is characterized by a flighting design with a constant flight angle. For purposes of this invention, pitch is the theoretical or actual distance between comparable adjacent points on a full (360°) wrap of the flighting. The slope or tangent of the angle of the flighting at the root diameter can then be calculated from the equation $$S = P/(D \times \pi),$$

where
P is the pitch, and
D is the root diameter.

A characteristic feature of the feed section of an extruder screw is the lesser root diameter to accommodate the entry of the feed material entering the extruder apparatus through a hopper (not shown). As a consequence, the slope, from the above equation, will be greater at location 30 than at location 32. This fact makes the areas at the juncture of the helix and the root diameter particularly susceptible to back flow when the pressure flow component becomes dominant. The lessened resistance to back flow due to the greater slope in effect becomes an "escape valve" to alleviate the pressure flow force when it becomes a dominating factor. Thus, this arrangement, without the back flow seals of this invention, can lead to material slippage at location 30 when resistance to forward material motion is encountered in the transition section.

Figure 2:
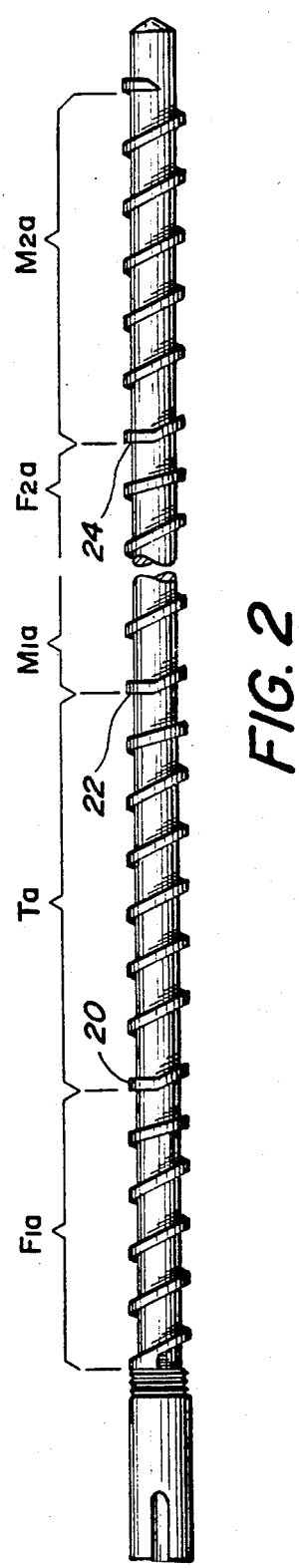
FIG. 2 is a side elevation of an extruder screw similar to FIG. 1 but showing the inventive features according to this invention.

To attain more positive forward motion to increase capacity by minimizing slippage, this invention utilizes the back flow seals as defined herein. Specifically, it is within the scope of this invention to greatly minimize back flow by utilizing back flow seals at strategic positions along the extruder screw. By way of illustration, such seals 20, 22, 24, 26 are shown in FIG. 2 at a position just preceding the transition section $T_a$, at the end of transition section $T_a$, at the end of feed section $F_{2a}$, and the end of metering section $M_{2a}$, respectively.

Figure 4:
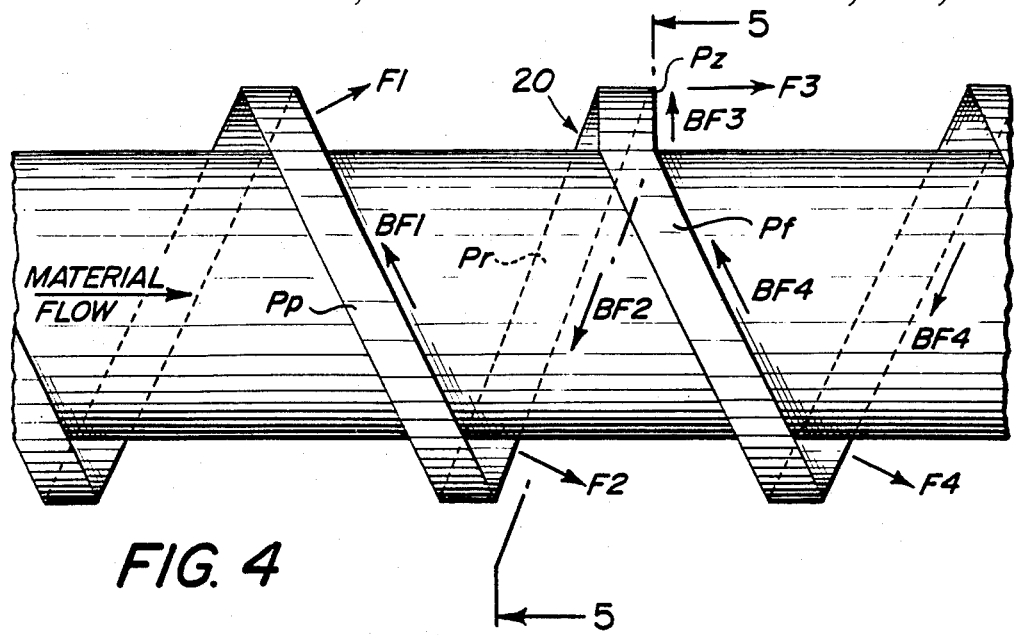
FIG. 4 is a partial enlarged side elevation showing details of a back flow seal of the extruder screw illustrated in FIG. 4.
Figure 5:
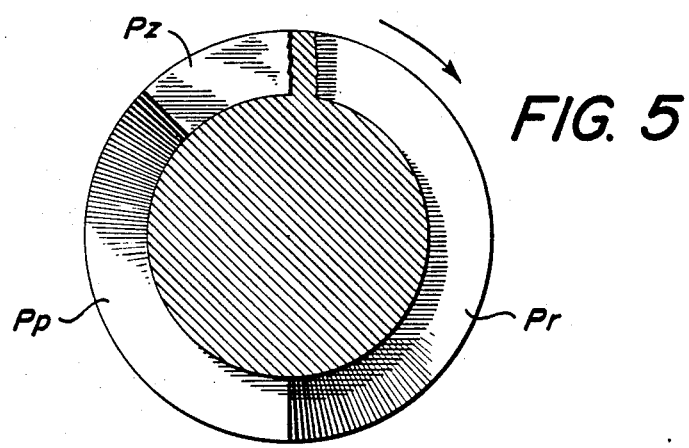
FIG. 5 is a sectional view taken along line 5—5 of FIG. 4.

A back flow seal according to this invention is illustrated in detail in FIGS. 4 and 5. Such a seal employs a section of flighting having a reduced pitch $P_r$, followed by a short length of flighting having zero pitch $P_z$. Preferably, the flighting section of zero pitch is relatively short and will not exceed about 90° or one-quarter wrap.

After the back flow seal, such as shown at 20 in FIG. 4, the pitch $P_f$ of the flighting will increase to greater than $P_r$. In other words, the pre-seal flighting may be resumed. The significance of such back flow seal will be appreciated by the further discussion which follows.

From the slope equation, $S = P/(D \times \pi)$, it will be seen that there are theoretically two ways to decrease the slope of the helix flighting and thus minimize the back flow and its attendant problems. This may be accomplished by decreasing the pitch of the flighting, or by increasing the root diameter. However, neither of these changes in itself would constitute a viable solution. Decreasing pitch can be volume capacity limiting, and increasing the root diameter decreases channel volume and therefore also can be capacity limiting.

It was discovered that through a careful examination of the forces acting upon and within the extruder apparatus, it was possible to greatly minimize back flow and to enhance compression and capacity by utilizing the back flow seals of this invention. Such a backflow seal according to this invention is shown in elevation in FIG. 4. For convenience in illustrating such seal, the seal, including the preceding and following portions, have different pitches, identified respectively as $P_p$, $P_r$, $P_z$, and $P_f$.

The seal itself comprises a length of flighting having a reduced pitch $P_r$, i.e. reduced by about 10 to 40% over that of the pitch $P_p$ of the preceding flight, followed by a shorter length of flighting having zero pitch $P_z$. The flighting length of reduced pitch $P_r$ may be a complete wrap, but as shown in FIG. 5 is about 180°, or about one-half wrap. The flighting of zero pitch $P_z$ should be as long as possible without constricting the channel volume to a detrimental degree. Accordingly, as shown in FIG. 5, the preferred length of such flighting would never exceed about one-quarter wrap, or from 15° to 90°.

Returning to FIG. 4, the back flow seal of this invention works as follow. The back flow force is generated as discussed in the prior art and is depicted as BF4. This counter flow force will cause material to proceed along channel 18 until it meets the material under the influence of the zero pitch $P_z$ section. At this juncture, the force BF4 will be in conflict with the positive force F3 which is parallel to the barrel face. Consequently, the back flow force BF4 will be greatly diminished. What is left of the force BF4 will be deflected toward the barrel (not shown) and become a weakened force BF3. Such weakened force is further affected by the strong conveying positive force F2, the result of the reduced pitch $P_r$, and finally becomes under control as weakened force BF1.

The strategic locations for these seals should be just prior to any compression section, and at the end of the discharge flighting to facilitate a more positive flow through whatever discharge resistance is being employed. It may also be advantageous to utilize the seal midway in long metering sections.

As a consequence of the utilization of the back flow seals, as described herein, greater latitude in design will be gained so as to allow distribution of resistance through use of several shorter compression sections. These compression sections can utilize larger pitches to more efficiently force the mix material against the heated barrel to effect more rapid melting. Such sections would have incremented increases in root diameter to decrease the annular area between the root diameter and the inner barrel wall for passage of material, and thereby effect compression and subsequent melt. Thus, the primary reliance on the resistance of the final discharge opening will be minimized, and work done on the material will be distributed over several compression sections in a much more controlled, designed manner. In such a system, heat transfer will be enhanced, and the machine horsepower will be better used to accomplish the required compression and frictional work for the required melt at greater capacities. By the use of such back flow seals at appropriate locations along the extruder screw, as discussed above, homogeneity of the product will be enhanced by the positive conveying properties of the improved extruder screw of this invention. Thus, what is fed into the extruder apparatus will be discharged more precisely according to the proportions in the feed mix. The proposed back flow seal concept would have application in both single and double screw machines.

I claim:

1. In extrusion apparatus, where the apparatus is subject to the opposing forces of drag flow and pressure flow, comprising a housing and an extruder screw extending substantially the length of said housing, where said extruder screw in sequence from one end thereof contains a feed section, a transition section, and a metering section, the improvement comprising in combination therewith the provision on said screw of a first back flow seal prior to said transition section, and a second back flow seal near the end of said extruder screw to minimize said pressure flow; wherein each said back flow seal comprises a first length of flighting having a reduced slope over that preceding said first length of flighting, and a second length of flighting having zero slope measure from a line perpendicular to a rotation axis of the screw.

2. The improved extruder screw of claim 1 wherein said preceding length of flighting has a slope $S_1$, said first length of flighting has a slope $S_2$, and said second length of flighting has a slope $S_3$, where $S_1$ is a positive angle from the line perpendicular to the rotation axis of the screw,
$S_2$ is $>0°$ but less than $S_1$, and
$S_3$ is $0°$.

3. The improved extruder screw of claim 2 wherein said first length of flighting is no more than a single wrap about said extruder screw.

4. The improved extruder screw of claim 2 wherein said second length of flighting is no more than one-quarter wrap about said extruder screw.

5. The improved extruder screw of claim 2 wherein said first back flow seal is at the junction of said feed section and said transition section.

6. The improved extruder screw of claim 2 wherein the length of the flighting having slope $S_2$ is from 10 to 40% less than the length of the flighting having slope $S_1$.

7. The improved extruder screw of claim 4 wherein the length of said second length of flighting is between 15° to 90° of a theoretical full wrap.

* * * * *